Patented July 9, 1929.

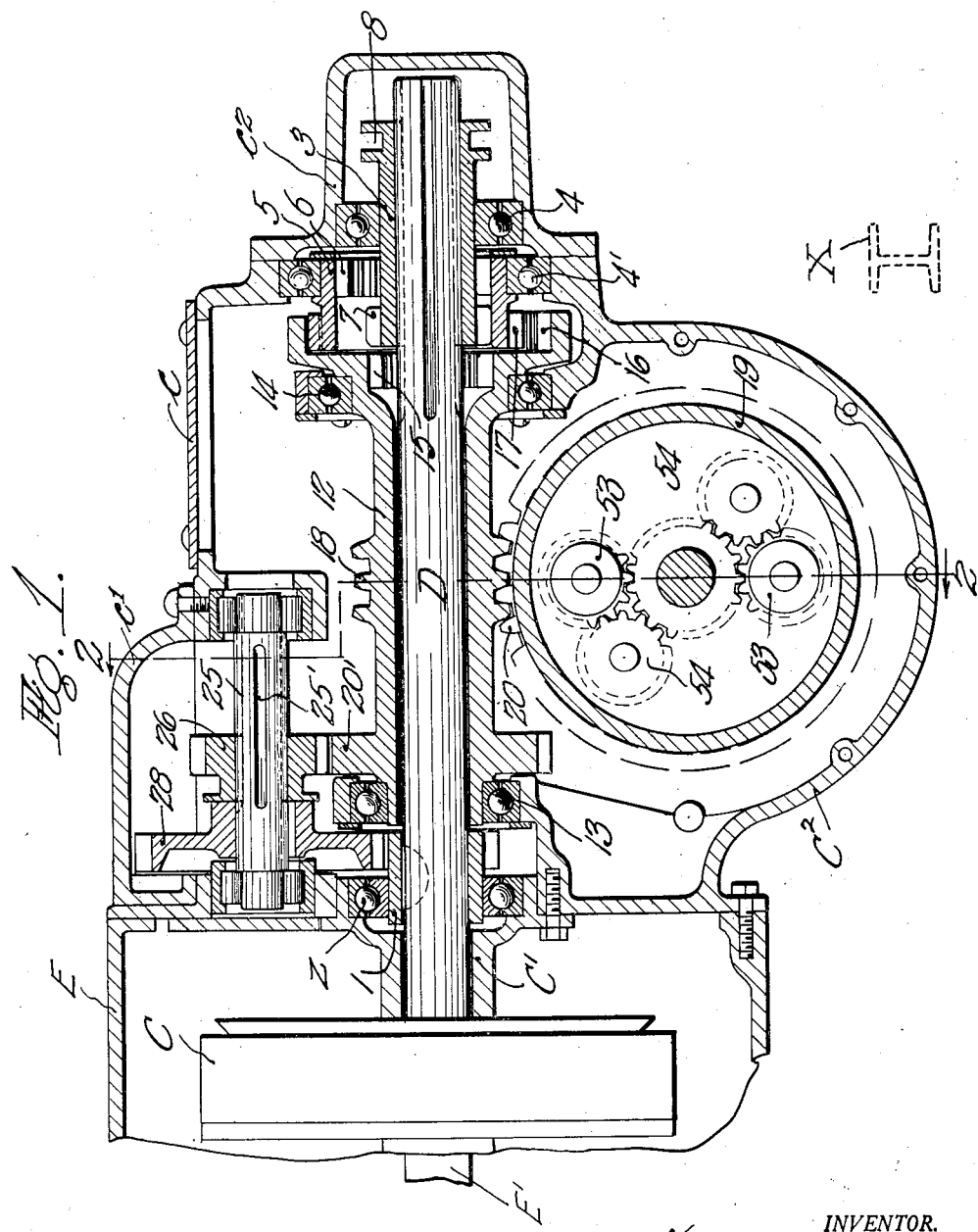

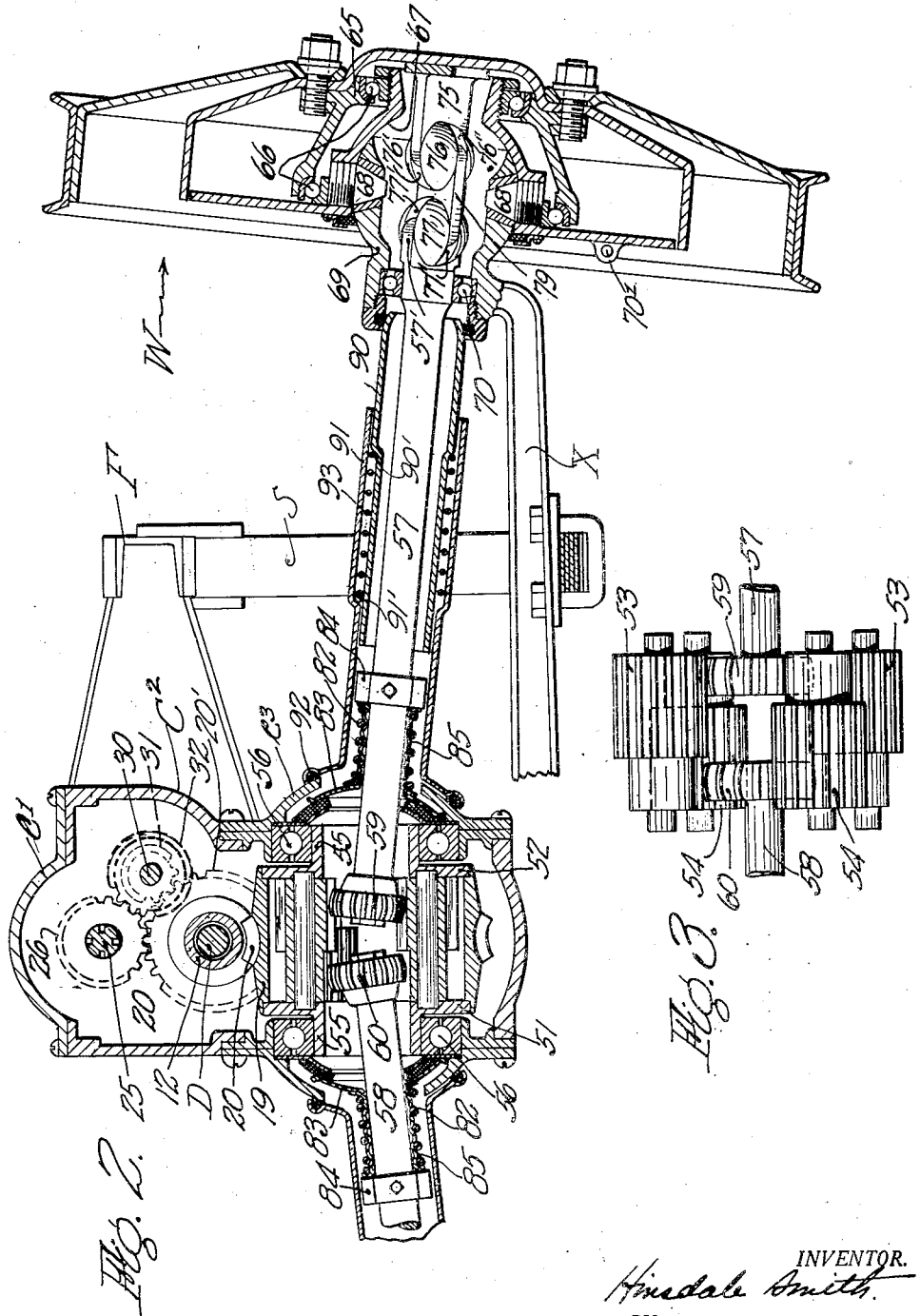

1,720,064

UNITED STATES PATENT OFFICE.

HINSDALE SMITH, OF SPRINGFIELD, MASSACHUSETTS, ASSIGNOR TO INGLIS M. UPERCU, OF NEW YORK, N. Y.

FRONT-WHEEL DRIVE MECHANISM.

Application filed May 26, 1927. Serial No. 194,462.

This invention relates to improvements in driving mechanism for vehicles and is directed more particularly to mechanism for connecting and driving a wheel or wheels of a vehicle from the driving shaft of a power plant carried by said vehicle.

The novel construction and arrangement of parts renders the features of my invention adaptable wherever it is desired to connect and drive a wheel or wheels from a power plant and the unique and novel features of the invention will be disclosed in connection with its adaptation for the so-called "front wheel" drive of a motor vehicle.

Various problems present themselves in connection with mechanism of the type to which my invention relates and more particularly in connection with front wheel drives and as the novel features of my invention are directed to overcome the more troublesome and objectionable features of prior art structures, I shall refer briefly to those problems in order that my invention will be best understood.

It is common practice in all self propelled vehicles, especially motor vehicles, to resiliently support the power plant on the axles of the vehicle so that there may be a relative vertical movement of the power plant and axles. While in front wheel drive construction, especially since the wheels are pivoted to the ends of the axle by vertical pivots, they move relative to the axle in planes which make gradually decreasing angles from a right angle with respect to the axis of the vehicle axle, in order to effect steering.

These movements result in a relative movement of the wheel and driving shaft of the power plant towards and away from one another whether the relative movement of the frame and axle or that between the wheel and axle are considered and necessarily call for extreme flexibility of the connections between the power plant and wheels.

In other words, any connection between the power shaft and wheel must allow and compensate for the relative movement between the power plant and axle and at the same time take care of the movements of the wheel and power shaft towards and away from one another. To provide for this, it has been customary to connect an intermediate shaft through universal joints to the power shaft and wheel. The joint at the power shaft end is usually located at a considerable distance from the power shaft which is ordinarily on the center line of the vehicle and by being thus located necessarily provides a comparatively short intermediate shaft which is undesirable.

With the short shafts referred to, the universal joints in operation are subjected to excessive wear and there is a loss of power due to friction because the joints are called upon to pass through sharp angles in their universal action.

According to one feature of my invention, I provide a novel means of connecting the so-called intermediate shaft to the power supplying mechanism which is adapted to be disposed closely adjacent to the axis of the power shaft so that a comparatively long shaft may be employed to reduce the angularity thereof in operation and thereby reduce the frictional action of the universal joints.

According to another feature of the invention, I provide connecting means between the power shaft and wheels adapted to compensate for the relative movements of the power plant and wheel, whether the movement be towards and away from one another or in relative up and down directions, and the compensation is accomplished by providing intermeshing gears arranged for combined relative rocking and sliding movements.

According to a further feature of the invention, I provide means for connecting the wheel and intermediate shaft which is arranged to function as an equalizer to eliminate any relative speed fluctuating tendency of the intermediate shaft and wheel.

According to another important feature of my invention, I provide a means for operating the intermediate shafts through a system of change speed gearing and differential mechanism so that the wheels may be driven at various desired speeds in accordance with present day practice.

According to a still further feature of the invention, I provide a driving mechanism which is compact in design so as to occupy small space and thereby be especially adapted for use at the forward end of an automobile chassis and this compactness is accomplished primarily by arranging the parts in a novel manner.

Other features and advantages forming the novel features of the invention will be observed from the following description of the invention which is illustrated in the form at present preferred by means of the accompanying drawings, in which:

Fig. 1 is a longitudinal sectional view through the apparatus and casing of my invention showing a typical clutch mechanism for connecting the same to an engine or the like;

Fig. 2 is a transverse sectional elevational view taken on the line 2—2 of Fig. 1; and Fig. 3 is an end elevational view of the differential driving pinions removed from their casing.

Referring to the drawings in detail: the forward portion of an engine casing is represented at E, which as usual is preferably mounted on a frame F which in turn is resiliently mounted on a forward axle X by springs S in the usual and well known manner. A crank shaft E' of the engine (not shown) is arranged in the well known manner to be clutched by means of a clutch mechanism C to a power or driving shaft D. The engine or clutch mechanism forms no part of the present invention and are referred to merely to indicate that the shaft D may be driven as and when desired as is usual in connection with mechanisms of this character. $C^2$ represents a casing or housing for the novel change gear and differential mechanism forming a part of this invention and is preferably arranged and adapted to be fixed to and supported by the engine casing E. It has various removable covers or the like such as $c$, $c^1$, $c^2$, $c^3$, etc.

The shaft D has fixed to its rear end a gear 1, the hub of which is rotatably supported in a ball bearing Z and a shiftable member at the forward end of the shaft is slidable but non-rotatable on said shaft and is supported for rotation in a ball bearing 4. Thus, the shaft is arranged for free rotative movements for driving the mechanism to be described while the member 3 is slidable thereon for connecting said shaft to various groups of mechanism.

A ring-like member 5 is rotatably supported by a ball bearing 4' and has external and internal gears 17 and 6 on opposite ends thereof, the parts being arranged so that said gears are disposed eccentrically with respect to the axis of rotation of shaft D.

A hollow worm 12 is provided which has a central axial bore preferably larger than the shaft D so as to be out of contact therewith and is rotatably supported independent of said shaft at its rear and forward ends by bearings 13 and 14 suitably mounted intermediate the ends of the casing or housing $C^2$. This worm is mounted independently of the shaft as described so as to avoid frictional contact between it and said shaft and so that any relative disalignment or weaving action of either the worm or shaft will not be transmitted from one to the other, whereby they will be perfectly free for independent rotative movements. Teeth to form internal gears 15 and 16 are provided at the forward end of the worm member 12 (as shown), the former being arranged to engage with a gear 7 of member 3 and the latter for engaging with the external gear 17, both of which are eccentrically disposed with respect to shaft D.

A worm or screw threaded portion 18 preferably disposed intermediate the ends of the member 12 is in driving engagement with suitable teeth (as shown) on the outer periphery of a differential shell 19 and an external gear 20' at the rear end thereof is provided for engaging with certain gears which will later be described.

The member 3 by being shiftable along the shaft D may be utilized when shifted to the left or rear from the position shown in Fig. 1 to lock, by engaging the gears 7 and 15, the shaft D and member 12 together for "direct" or "high speed" operation. When shifted to the right so as to engage with the gear 6, the member 5 will be rotated thereby and it being in engagement with the internal gear 16 of the member 12 will rotate said member at a speed different than that of shaft D. In the embodiment shown due to the relative sizes of the gears, the member 12 will be driven at a speed slower than that of the shaft D and may be called second or intermediate speed when the member 3 is thus engaged with gear 6.

By providing the engaging internal and external gears described and by providing the bearings substantially in the plane of contact of said gears, it is not only possible to nest the parts so that they occupy small space and thereby reduce the dimensions of the apparatus, but the thrusting strains of the engaging parts is taken up by bearings which in effect surround the parts.

A jack shaft 25 is disposed above the shaft D and is suitably journalled in the casing, as shown. This shaft is preferable provided with splines 25' or the like or may be squared or otherwise formed so that a shiftable member 26 in the form of a gear may be non-rotatable but slidable therealong so as to be moved from engagement with the gear 20' of the worm 12 into another position, soon to be referred to. A gear 28 is fixed to the shaft 25 and is in engagement with the gear 1 of the shaft D whereby said shaft 25 is driven by shaft D. When in operation, the member 26 is in the position shown in Fig. 1, the forward clutch member 3 is held in its non-engaging position shown so that the worm 12 is rotated from the shaft D through gears 1, 28, 26 and 20' at a speed which may be termed "slow" or "first" speed.

An idler shaft 30, also suitably journalled in the housing and disposed at a side of the shafts 25 and D as shown in Fig. 2, has fixed thereto a gear 31 in engagement with the gear 20' of the worm member 12 and another gear 32 adapted to be engaged by the gear 26 slidable on shaft 25. When the gear 26 is shifted forwardly from the position shown and into engagement with gear 32 so as to drive shaft 30, the gear 31 thereof will in turn drive the member 12 in a direction reverse to that of shaft D and this may be termed "reversed" speed.

The mechanism for shifting the members 3 and 26 may be of usual and ordinary form and while it forms no part of this invention, it will preferably be arranged so as to shift said members so that the worm member 12 will be driven at the desired various speeds and in the directions desired accordingly as it is desired to drive the differential shell 19.

The differential mechanism will now be described. The shell 19, having a circumferential worm gear 20 in mesh with the worm 18 of the member 12, preferably comprises a cylindrical or hollow drum-like body which has ring-like header plates 51 and 52 removably secured thereto. These plates receive on their inner faces the trunnions or pairs of interengaging differential pinions 53 and 54 and are provided with outwardly extending rims 55 which are rotatably supported in ball bearings 56 mounted in the housing $C^2$ so that the shell may be freely rotated in either direction by the worm member 12.

Intermediate driving shafts 57 and 58 for connecting the wheels to the mechanism carry on their inner ends driving pinions 59 and 60 which mesh with the differential pinions 53 and 54,—the pinion 59 meshing with pinions 53 only of each pair and the pinion 60 meshing with the other pinion 54 of each pair as illustrated in Fig. 3. The general characteristics of the mechanism just described correspond to those of the ordinary form of differential so that the shafts 57 and 58 may be driven at corresponding or different speeds as is necessary and desirable in order to obtain the differential effect desired.

The mechanism, however, has certain novel characteristics which will now be more fully referred to. The engaging faces of the pinions 59 and 60 are preferably crowned or curved so that while in meshing engagement with their respective pair of pinions 53 and 54 they may oscillate therebetween or rotate with respect thereto as the shafts 57 and 58 are moved up and down by a relative movement of the housing and wheel. Also since the relative movement referred to as well as the pivotal movement of the wheel W will cause a longitudinal movement of the shafts 57 and 58, the pinions 59 and 60 are adapted for a sliding movement along pinions 53 and 54. Thus the pinions are not only constructed and arranged to provide an action similar to that of a universal joint but also in addition thereto permit of a relative sliding movement not provided for in ordinary universal joint construction.

It will also be noted that the pinions 59 and 60 are located at a point closely adjacent to a line drawn perpendicularly through the axis of the driving shaft D, wherefore I am enabled to employ relatively long intermediate shafts to the end that the normal angularity may be maintained at a minimum so that their angularity in operation never becomes objectionably excessive as the housing moves up and down with respect to the axle and wheels. As both of the front wheels are of like construction, as are also the connections thereto, I have shown and will describe one only as follows.

The wheel W may be of any ordinary construction desired, but will preferably have a central hub portion 65 which is mounted by means of ball bearings 66 to freely rotate on a spindle portion 67.

The spindle 67 is pivoted by means of the pivotal connections 68 to a support 69 which is carried by and integral with the ends of axle X and may be swung on its pivots by means of any usual steering apparatus (not shown) which may be connected thereto at 70' or at any other convenient place.

The outer end of the intermediate shafts 57 and 58 are suitably journalled in the support 69 by ball bearings 70 (as shown) so that said shafts may freely rotate and be moved longitudinally thereof as the wheel is moved on its pivot for the steering action.

The said shafts 57 and 58 are connected to the wheel hub 65 by means of a pair of universal joints which may be of any desired form, but a simple form of construction which is easily disassembled and which I have found to possess the desirable features to cooperate with the embodiment of my invention will now be described.

The outer ends of the shafts 57 and 58 are forked as at 57' and a member 75 fixed to the wheel hub is likewise forked for fitting in grooves 76' and 77' of ball members 76 and 77. A link member 79 also has forks at its opposite ends which fit within grooves 76" and 77" of the balls 76 and 77 and serve to connect the parts together for driving the wheel by the shaft 57.

This construction permits freely working joints and to retain the forks in the grooves I provide springs 82 interposed between a flange 83 which bears against the housing and a collar 84 fixed to the shafts. A sleeve or boot 85 surrounding the shafts and preferably of a flexible material is provided which cooperates with the flange 83 to seal the opening around the shaft to prevent lubricant from being thrown therefrom. It will be noted that the forks 57' and 75 are shown as being in the same plane. This is desirable as the arrangement tends to eliminate any tendency of speed fluctuation or difference in speed between the shaft and wheel during the working action of the joints.

A housing for each of the drive shafts is provided which comprises a pair of relatively slidable tubes 90 and 91. The tube 90 preferably has a rounded end (as shown) adapted to rest in a suitable seat of the axle support and the tube 91 has an annular recess for a packing ring 92 as shown for engaging with or seating on the housing.

The inner ends of the tubes are preferably offset to provide a space therebetween for receiving a suitable spring 93 therein which bears against shoulders 90' and 91' of the tubes and tends to separate the tubes and force them into contact with their respective seats. This construction permits a relative movement of the housing and wheel and not only protects the parts from the elements but also serves to prevent lubricant being thrown therefrom.

It will be observed that I have provided a change gear mechanism which has a driver mounted independently of the driving shaft while interengageable gears are mounted at either end of the driver for connecting the same to said shaft whereby the driver is driven therefrom at various speeds.

Also I have provided a differential mechanism of novel form which has intermediate shafts connected thereto by gears which are adapted to function therewith as universal joints and also adapted for a sliding action to accommodate relative movements of the power supplying mechanism and wheel. Also it will be noted that the intermediate shafts are connected to the differential in such a manner as to provide substantially long intermediate shafts to maintain the angularity thereof at a minimum while the connections between said shafts and wheels are of such a character and arrangement as to overcome any speed fluctuating tendency of the shaft and wheel and at the same time permit a free pivotal action of the wheel on the axle and a relative movement of the driving mechanism and wheel towards and away from one another.

I am aware that many changes may be made in the form of the invention to adapt it to various uses, and I therefore prefer to be limited by the appended claims rather than by the foregoing description.

What I claim is:

1. Driving apparatus for vehicles comprising in combination, a rotatable driving mechanism including differential driving gears, a wheel pivotally mounted for movements relative to said mechanism, a shaft for driving said wheel from said mechanism, flexible joints connecting an end of said shaft to said wheel disposed at opposite sides of the pivotal axis of said wheel, a gear fixed to the opposite end of said shaft in swinging engagement with and entirely supported by certain of said differential gears and adapted for a relative sliding movement with respect thereto.

2. Driving apparatus for vehicles comprising in combination, a housing and a driving mechanism, a wheel, a driving shaft, separable flexible driving connections between said shaft and wheel, and means interposed between said housing and said shaft for maintaining said flexible connections in driving relation.

3. Driving apparatus for vehicles comprising in combination, a driving mechanism including differential driving gears, a wheel, a drive shaft, means for connecting and supporting one end of said shaft from said wheel, and a gear fixed to the other end of said shaft in engagement with certain of said differential gears, whereby the shaft is driven and entirely supported at its end by said gears.

4. Driving apparatus for vehicles comprising in combination, a differential casing having differential driving pinions journalled therein, driven pinions in engagement with said differential pinions arranged for sliding and rocking movements in respect thereto.

5. Driving apparatus for vehicles comprising in combination, a differential casing having pairs of differential driving pinions journalled therein, driven pinions in engagement with pinions of each pair having curved faces whereby they may rotate on an axis and slide with respect to said differential pinions.

6. Driving apparatus for vehicles comprising in combination, a rotatable driving mechanism including differential driving gears, a pivoted vehicle wheel, a shaft for said wheel driven from said gears having a gear on one end in sliding and tilting engagement with said gears whereby said shaft is supported at said end by said gears and a universal joint between the other end of said shaft and said wheel whereby the latter is driven by the former.

7. The combination of a vehicle having rotatable differential gears and a wheel pivoted to an axle with means for connecting said gears and wheel comprising, a shaft having a gear on one end in engagement with said differential gears arranged so that said shaft may slide and swing relative thereto, and flexible connections at the other end of said shaft for connecting the same to said wheel.

8. The combination in a vehicle of an axle having a wheel pivoted thereon, a driving mechanism having differential gears carried by a rotatable member, a shaft having its outer end slidably, rotatably and pivotally journalled in said axle, a gear fixed to the inner end of said shaft in engagement with said differential gears arranged and adapted whereby said gear and shaft are driven and supported by said gear and allowed to swing relative to one another, separable and flexible engageable connections between the outer end of said shaft and wheels, and means for forcing said connections into engagement.

9. The combination in a vehicle of an axle having a wheel pivoted thereon, a casing vertically movable with respect thereto having a driving mechanism journalled therein, differential gears carried by said mechanism, a driving shaft having its outer end slidably, rotatably and pivotally journalled in said axle, a gear fixed to the inner end of said axle in engagement with and supported by said differential gears, the said gears being arranged to permit a sliding and tilting movement of said shaft, separable and flexible engageable connections between the outer end of said shaft and wheel, and means interposed between said casing and shaft for urging said shaft outwardly for holding said connections in engagement.

10. In a vehicle, a housing having an opening in a side thereof, a shaft extending through said opening having a collar disposed adjacent said housing, a flexible closure around said shaft having its opposite ends superposed on said housing around the opening and on said collar, and a spring tending to urge the ends of said closure against said housing and collar.

11. A vehicle comprising in combination, a housing and driving mechanism, a wheel pivoted for movements on a support, driving connections between said mechanism and said wheel, an enclosure for said connections comprising relatively slidable tubular members having their opposite ends in engagement with said housing and support, and a spring interposed between said tubular members.

12. A vehicle comprising in combination, a housing and a driving mechanism, a wheel pivoted for movements on a support, driving connections between said mechanism and said wheel, an enclosure for said connections comprising relatively slidable tubes having their outer ends bearing on said housing and support, and a spring interposed between the inner ends of said tubes tending to urge the tubes apart so that their opposite ends bear on said housing and support.

13. A vehicle comprising in combination, a housing and a driving mechanism, a wheel pivoted on a support, a closure for a shaft connecting said mechanism and wheel including, a pair of tubes having their inner ends in sliding engagement and their outer ends in engagement with said housing and support, the inner ends of said tubes being offset so as to provide spaced shoulders and a spring between said shoulders tending to move said tubes in opposite directions.

In testimony whereof I have affixed my signature.

HINSDALE SMITH.